J. W. BARWICK.
COMBINATION CANE STRIPPER AND KNIFE.
APPLICATION FILED DEC. 29, 1919.
1,357,137.
Patented Oct. 26, 1920.
2 SHEETS—SHEET 1.
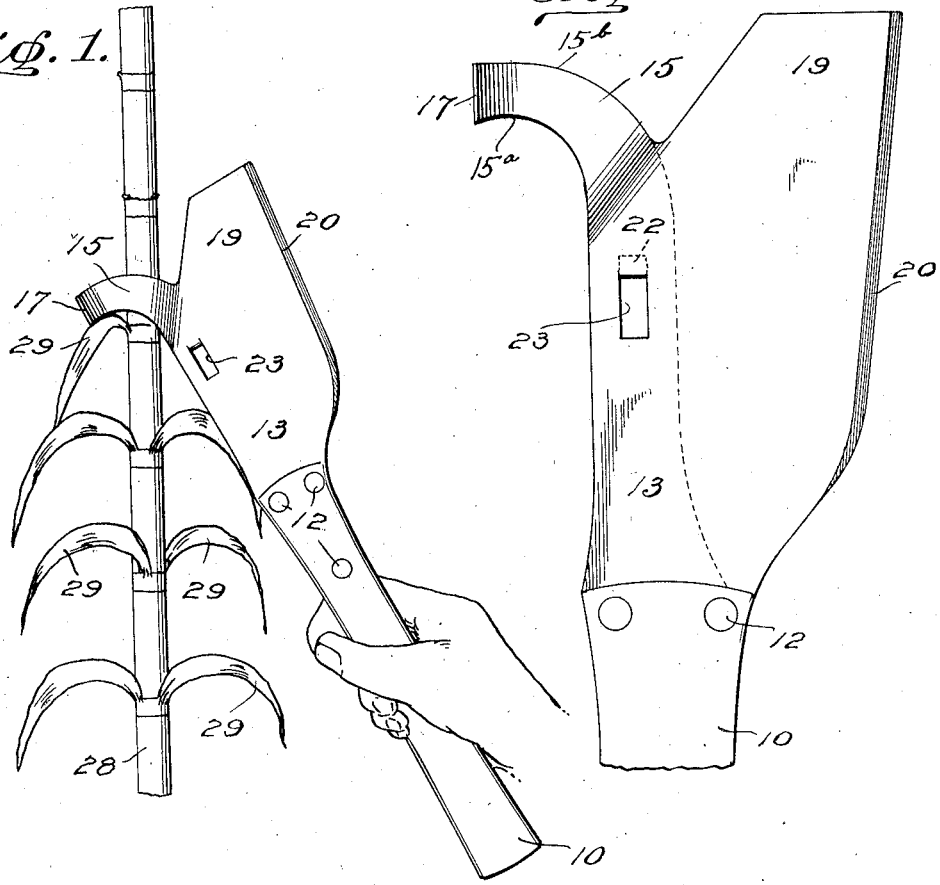
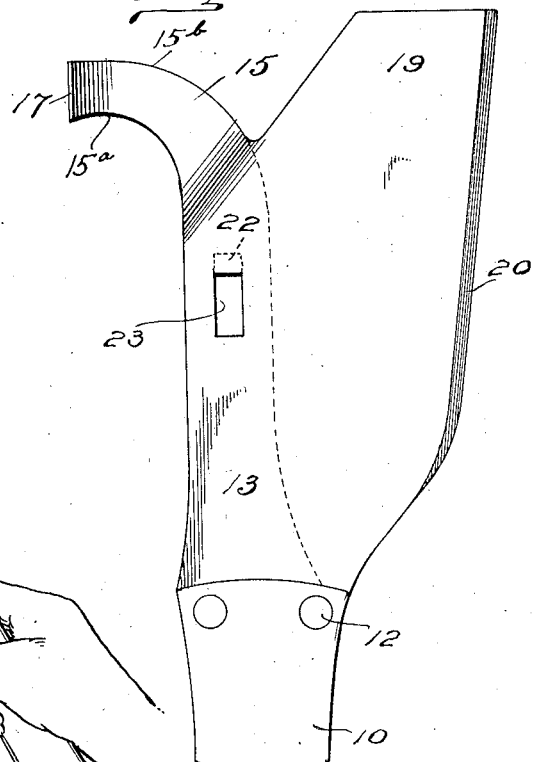
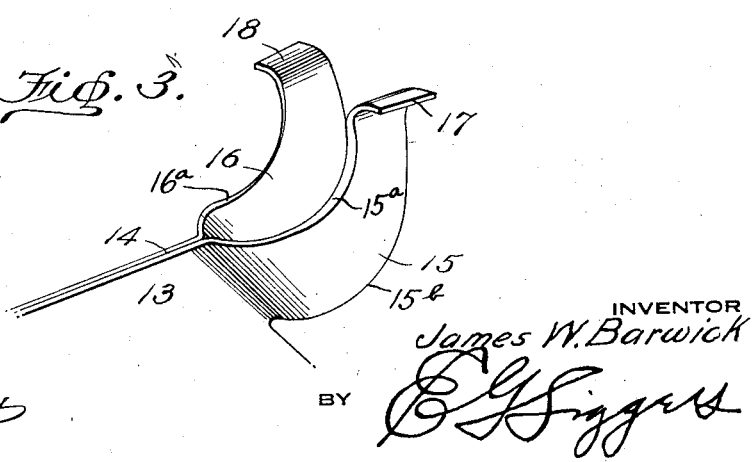
WITNESSES
E. E. Duffy
P. E. Siggers
INVENTOR
James W. Barwick
BY
C. G. Siggers
ATTORNEY J. W. BARWICK.
COMBINATION CANE STRIPPER AND KNIFE.
APPLICATION FILED DEC. 29, 1919.
1,357,137.
Patented Oct. 26, 1920.
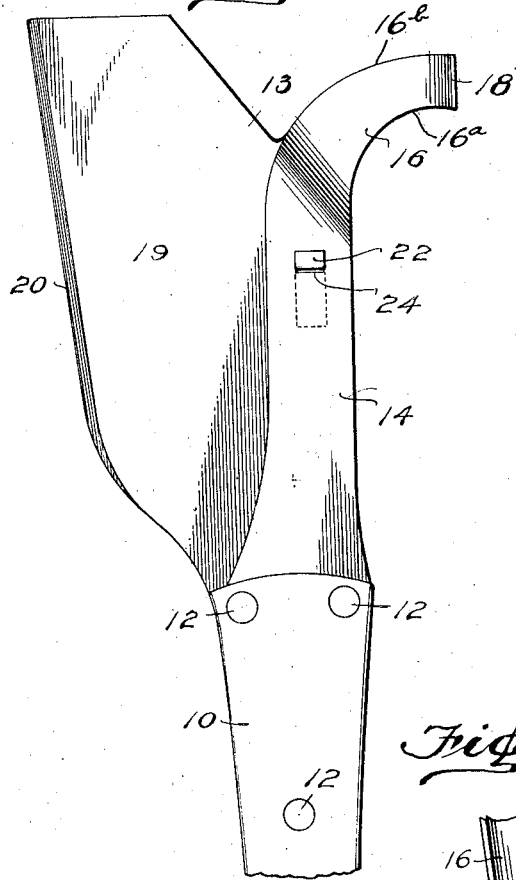
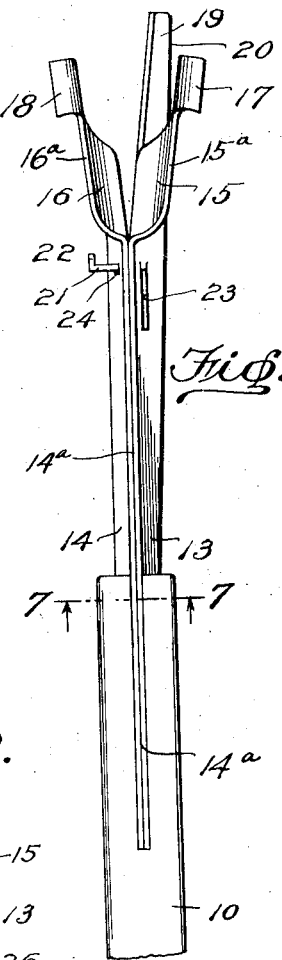
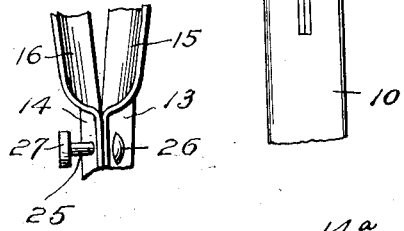
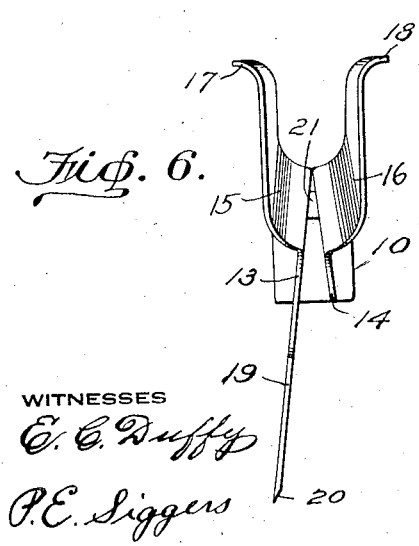
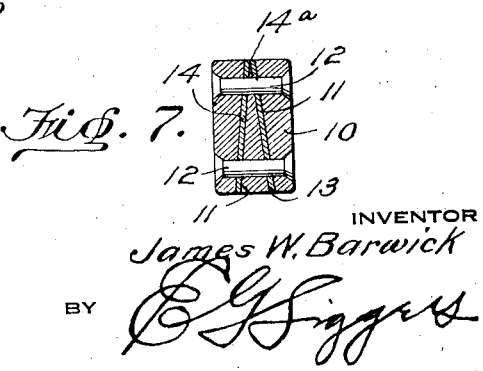
INVENTOR
James W. Barwick

UNITED STATES PATENT OFFICE.

JAMES W. BARWICK, OF PINEPARK, GEORGIA, ASSIGNOR TO MARK A. PALMOUR, OF ATLANTA, GEORGIA.

COMBINATION CANE STRIPPER AND KNIFE.

1,357,137.  Specification of Letters Patent.  Patented Oct. 26, 1920.

Application filed December 29, 1919. Serial No. 348,125.

*To all whom it may concern:*

Be it known that I, JAMES W. BARWICK, a citizen of the United States, residing at Pinepark, in the county of Grady, and State of Georgia, have invented a new and useful Combination Cane Stripper and Knife, of which the following is a specification.

This invention has reference to improvements in cane strippers, and the primary object is to provide in one implement a combined cane stripper and knife.

A general object of the invention is to provide a tool which one may use to strip the leaves, top the cane, rake the leaves from the base of the stalk, and cut the stalk close to the ground.

Further objects are to provide a cane stripper which will function while being pulled downwardly, which requires less strength to do its work, which strips the leaves better than the ordinary cane stripper, and which does not cut the stalk while still stripping.

Other objects are to provide a cane stripper whose blades are resilient in order to spring apart while having a normal tendency to approach, so that the blades will always grip the stalk irrespective of the diameter of the latter; and to provide a novel form of limiting means for preventing too great a separation of the blades.

As sugar cane is now harvested, a man will go along a row of cane, using a stripper to remove the leaves. After him a second workman will come whose duties are to top the cane and to cut the stalk as close to the ground as possible, when the stalks are thrown into a pile to be gathered by other workmen. By using the present invention a man is able to strip the leaves, top the cane, rake the leaves and fodder away from the base of the stalk and cut the same very close to the ground. Thus the use of the present invention does away with double handling of each stalk, thereby effecting economies in both time and labor.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of said invention as expressed in the appended claims.

In the drawings.

Figure 1 is an elevation of an embodiment of the invention shown in the act of stripping the leaves;

Fig. 2 is an elevation of the blade end of the improved implement, showing the knife which is integral with one of the blades;

Fig. 3 is an enlarged detail in perspective illustrating the shape of the extended end portions of the blades, which portions are provided for stripping the leaves;

Fig. 4 is a view similar to Fig. 2 but showing the other side of the implement;

Fig. 5 is an end elevation;

Fig. 6 is a top plan view;

Fig. 7 is a section on the line 7—7 of Fig. 5, looking in the direction indicated;

Fig. 8 is a detail showing a slightly modified form of the limiting means for the blades.

10 is the handle of the implement, which handle is provided with the longitudinally extending kerfs 11, disposed at an angle to each other as shown in Fig. 7. Two blades 13 and 14 are set into these kerfs at an acute angle to each other, rivets 12 or the like being passed through the handle and blades to secure the same together. With the blades 13, 14 set in the kerfs, they will meet at one face of the handle, as indicated at 14$^a$.

Both blades 13 and 14 have protruding tongues or end portions extending outwardly upon the upper ends of the same, said tongues or end portions being bent away from each other as indicated at 15 and 16, then brought to approaching relation, and finally flared outwardly to form lateral lips 17 and 18. These end portions or tongues are also curved in such a way that their outer ends lie approximately at right angles to the handle. The lower or working edges 15$^a$, 16$^a$ of the protruding tongues are blunt so that when the implement is passed down along the stalk, as shown in Fig. 1, the same will not be cut open.

One of the blades, as 13, is provided with an integral enlarged longitudinal extension 19 forming a knife with a cutting edge 20. This knife is preferably of a length greater than the length of the remainder of the blade and has a width considerably greater than either blade. The knife is located directly opposite the point where the blades engage each other.

The blades are preferably formed of spring steel, and being secured only at their lower ends to the handle are capable of springing apart a considerable distance. In order to prevent too great a separation of the blades, a stop means is provided which allows limited separation of the blades but prevents their being spread apart so far as to become permanently bent. In Figs. 1 to 6, inclusive, I have shown one form of stop means, which comprises a tongue 21 struck out from one of the blades, as 13, leaving a slot or perforation 23 and being passed through a hole 24 in the opposite blade 14. The outer end of the tongue 21 is bent at right angles to form a head 22, which engages with the outer face of the blade 14, when the blades are spread apart a distance equal to the length of the tongue 21.

There are many other forms of limiting means for the blades which might be used, one of such forms being shown in Fig. 8 where one of the blades 13 has riveted thereto a stud 25, as shown at 26, the other end of the stud having a head 27.

The present device is a very useful and satisfactory cane stripper because of the peculiar shape of the projecting tongues or end portions described. These tongues are flared outwardly so that when the implement is thrust in the general direction of the stalk, the same will enter between the end portions without any special dexterity on the part of the workman. The peculiar curve of these end portions allows the workman to pull downwardly on the tool while stripping the leaves, thus making his work much easier than if he were constantly holding the implement at right angles to his body. The bending of the tongues from and toward each other permits the embracing of the stalks so that the leaves will be removed on all sides. The blunt working or leaf-removing edges of these projecting tongues makes it impossible to slash into the stalk, which is likely to occur when working with a cane stripper having knife edges.

The manner in which the blades are mounted in the handle is believed to constitute a valuable feature of the invention. It will be noted that the blades which meet at $14^a$ stand at an acute angle with respect to each other, which causes the knife 19 to extend at an angle with respect to the handle, as shown in Fig. 6. The angle which the knife makes with respect to the handle allows rapid cutting of the stalks. The knife is so shaped as to be well out of the way of the stripping portion so as not to interfere with the operation of the same. The working edges $15^a$, $16^a$ of the protruding tongues are spaced apart to a less extent than the opposite edges $15^b$, $16^b$ of said tongues, whereby the leaves are stripped cleanly off the stalks regardless of the position in which the stalks stand.

The implement is well adapted to enable one man to do the same work which is now done by two with consequent saving of time and labor.

What is claimed is:

1. A cane stripper comprising a handle, a pair of blades fixed to said handle, and meeting along one edge and extending at an angle to each other, both blades having protruding tongues beyond the meeting point of the blades, said tongues curved away from each other, then toward each other, and finally flared outwardly to form lips, the two tongues also being curved in the direction of the active stroke of the implement when stripping, whereby said tongues may act as a rake as well as to strip the leaves throughout the length of the stalk.

2. A combined cane stripper and knife, comprising a handle, a pair of blades fixed to said handle, one of said blades having an integral knife portion, said knife portion having a length and width greater than the corresponding dimensions of the blades, said blades meeting at one edge opposite the knife and extending at an angle to each other, said knife partaking of the inclination of the blade of which it is a part.

3. A cane stripper comprising a handle, a pair of blades secured to the handle, said blades meeting throughout their length along one edge and extending in divergent planes, both blades having means for stripping leaves and being capable of springing apart, and means fixed to one of the blades and engaging with the other where the blades are close together for preventing undue separation of said blades.

4. A combined cane stripper and knife, comprising a handle, blades secured to said handle, one of said blades being formed with an integral knife, both blades having projecting tongues with blunt edges for stripping leaves, the tongues extending in a direction opposite to that of the knife, and being bent to embrace the stalks during the stripping operation.

5. A cane stripper comprising a handle, a pair of stripping blades secured to said handle, the said blades meeting along one edge and being separated along the opposite edge thus extending at an acute angle to each other, said blades being set in the handle at this angle.

6. A combined cane stripper and knife, comprising a handle, a pair of resilient stripping blades secured within said handle at an acute angle to each other and extending throughout their length at the same angle, one of the blades having a longitudinal extension provided with a knife edge, said extension partaking of the inclination of the blade of which it forms a part.

In testimony that I claim the foregoing as my own, I have hereto affixed my signature in the presence of two witnesses.

JAMES W. BARWICK.

Witnesses:
E. G. SIGGERS,
F. P. SMITH.